United States Patent
Wertheimer et al.

(10) Patent No.: US 9,454,204 B2
(45) Date of Patent: *Sep. 27, 2016

(54) NEGOTIATING A TRANSMIT WAKE TIME

(71) Applicant: INTEL CORPORATION, Santa Clara, CA (US)

(72) Inventors: Aviad Wertheimer, Tsur Hadassah (IL); Robert Hays, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 14/504,654

(22) Filed: Oct. 2, 2014

(65) Prior Publication Data

US 2015/0134991 A1   May 14, 2015

Related U.S. Application Data

(63) Continuation of application No. 13/489,434, filed on Jun. 5, 2012, now Pat. No. 8,898,497, which is a continuation of application No. 12/381,811, filed on Mar. 17, 2009, now Pat. No. 8,201,005.

(51) Int. Cl.
   *G06F 1/32* (2006.01)
   *G06F 1/26* (2006.01)

(52) U.S. Cl.
   CPC ........... *G06F 1/3203* (2013.01); *G06F 1/3209* (2013.01); *Y02B 60/43* (2013.01)

(58) Field of Classification Search
   CPC .... G06F 1/3203; G06F 1/3209; Y02B 60/43
   See application file for complete search history.

(56) References Cited

U.S. PATENT DOCUMENTS

| | | |
|---|---|---|
| 6,408,006 B1 | 6/2002 | Wolff |
| 7,269,629 B2 | 9/2007 | Zmudzinski et al. |
| 8,155,597 B2 * | 4/2012 | Nabar et al. .................... 455/69 |
| 8,201,005 B2 | 6/2012 | Wertheimer et al. |
| 8,213,303 B2 | 7/2012 | Wang et al. |
| 8,839,015 B2 | 9/2014 | Hays |
| 2002/0004840 A1 | 1/2002 | Harumoto et al. |
| 2002/0196736 A1 | 12/2002 | Jin |
| 2005/0147082 A1 | 7/2005 | Keddy et al. |
| 2005/0204072 A1 | 9/2005 | Nakagawa |
| 2005/0238035 A1 | 10/2005 | Riley |
| 2006/0164774 A1 | 7/2006 | Herbold et al. |
| 2007/0086451 A1 * | 4/2007 | Sato et al. .................... 370/389 |
| 2007/0253399 A1 | 11/2007 | Deshpande et al. |
| 2008/0159183 A1 | 7/2008 | Lindoff et al. |
| 2009/0249096 A1 | 10/2009 | Conner et al. |
| 2010/0165846 A1 | 7/2010 | Yamaguchi et al. |
| 2013/0170349 A1 | 7/2013 | Wang et al. |
| 2015/0046731 A1 | 2/2015 | Hays |

OTHER PUBLICATIONS

Mohapatra S et al., "Dynamo: A Cross-Layer Framework for End-to-End QoS and Energy Optimization in Mobile Handheld Devices", IEEE Journal on Selected Areas in Communications, IEEE Service Center, Piscataway, US, vol. 25, No. 4, May 1, 2007, pp. 722-737.

(Continued)

*Primary Examiner* — Thuan Du
(74) *Attorney, Agent, or Firm* — Alpine Technology Law Group LLC

(57) ABSTRACT

Includes receiving, from a link partner, a message specifying a link partner receive wake time and resolving to the lesser of the received link partner receive wake time and a local transmit wake time.

22 Claims, 11 Drawing Sheets

OTHER PUBLICATIONS

Shiao-Li Tsao et al., "Reducing voice over WLAN call setup delay under limited access point buffer", Consumer Communications and Networking Conference, 2006. CCNC Jun. 20, 2006 3RD IEEE Las Vegas, NV, USA Jan. 8-10, 2006, Piscataway, NJ, USA, IEEE, vol. 1, Jan. 8, 2006, pp. 380-384.

* cited by examiner

| Message Count# | M 10 | M 9 | M 8 | M 7 | M 6 | M 5 | M 4 | M 3 | M 2 | M 1 | M 0 | Message Code Description |
|---|---|---|---|---|---|---|---|---|---|---|---|---|
| 10 | 0 | 0 | 0 | 0 | 0 | 0 | 0 | 1 | 0 | 1 | 0 | EEE Technology Message Code. EEE capability 2 unformatted next pages to follow. |

FIG. 8

| Bit | Bit definition |
|---|---|
| U10 | Next page - 1 |
| U9:U7 | Reserved, transmit as 0 |
| U6 | 10GBASE-KR EEE support (0 = no, 1 = yes) |
| U5 | 10GBASE-KX4 EEE support (0 = no, 1 = yes) |
| U4 | Reserved, transmit as 0 (for future 1000BASE-KX) |
| U3 | 10GBASE-T EEE support (0 = no, 1 = yes) |
| U2 | 1000BASE-T EEE support (0 = no, 1 = yes) |
| U1 | 100BASE-TX EEE support (0 = no, 1 = yes) |
| U0 | Reserved, transmit as 0 (for future 10BASE-T) |

FIG. 9

| Bit | Bit definition |
|---|---|
| U10 | Next page (to enable support of future technologies) |
| U9:U7 | Reserved, transmit as 0 |
| U6 | 10GBASE-KR PHY refresh cycle (0 = Reduced Energy, 1 = Lowest Energy) |
| U5 | 10GBASE-KX4 PHY refresh cycle (0 = Reduced Energy, 1 = Lowest Energy) |
| U4 | Reserved, transmit as 0 (for future 1000BASE-KX) |
| U3* | 10GBASE-T PHY refresh cycle (0 = Reduced Energy, 1 = Lowest Energy) |
| U2 | 1000BASE-T PHY refresh cycle (0 = Reduced Energy, 1 = Lowest Energy) |
| U1 | 100BASE-TX PHY refresh cycle (0 = Reduced Energy, 1 = Lowest Energy) |
| U0 | Reserved, transmit as 0 |

FIG. 10

| Bytes | Content | Value | Description |
|---|---|---|---|
| 6 | MAC DA | 01-80-C2-00-00-0E | LLDP_Multicast address |
| 6 | MAC SA | | MAC address of sending station or port |
| 2 | Ethertype | 88-CC | LLDP Ethertype |
| 9 | Chassis ID TLV | | Mandatory TLV (see 802.1AB) |
| 9 | Port ID TLV | | Mandatory TLV (see 802.1AB) |
| 4 | Time To Live TLV | 127/8 | Mandatory TLV (see 802.1AB) |
| 2 | TLV type/Length | | TLV Type and Length |
| 3 | OUI | 00-12-0F | 802.3 OUI |
| 1 | Subtype | | Energy Efficient Ethernet 802.3 subtype |
| 4 | System Wake Times | | System wake time advertisement |
| 1 | EEE PHY parameters | | PHY refresh duty-cycle parameters |
| 2 | End Of LLDPDU TLV | 00-00 | Mandatory TLV (see 802.1AB) |
| 14 | Padding + CRC | | |

FIG. 11

| Bit | Content | Value | Description |
|---|---|---|---|
| 31:16 | Transmit Tw_system capability | | System Wake Time, in microseconds, the system is capable of waiting before it must transmit data. For example, this could be a function of Tx system buffer depth. |
| 15:0 | Receive Tw_system request | | System Wake Time, in microseconds, the system is requesting its link partner to hold off data transmission to enable the system to wake from the desired power-saving state. For example, this could be a function of system resume latency from the desired system power-saving states. |

FIG. 12

| Bit | Content | Value | Description |
|---|---|---|---|
| 7:1 | Reserved | 0x0 | Reserved |
| 0 | Refresh duty-cycle | | Quiet (Tq) & Refresh (Tr) time ratios for PHY power optimization<br>0 = "Reduced energy" duty cycle (Tq:Tr = n:1)<br>1 = "Lowest energy" duty cycle (Tq:Tr > n:1) |

FIG. 13

NEGOTIATING A TRANSMIT WAKE TIME

RELATED APPLICATIONS

This application is a continuation of U.S. patent application Ser. No. 13/489,434, filed on Jun. 5, 2012, entitled "NEGOTIATING A TRANSMIT WAKE TIME", which is a continuation of U.S. patent application Ser. No. 12/381,811 filed on Mar. 17, 2009, now U.S. Pat. No. 8,201,005, and entitled, "NEGOTIATING A TRANSMIT WAKE TIME". The current application claims priority to the Ser. No. 12/381,811 application via the Ser. No. 13/489,434 application. Both the Ser. No. 12/381,811 and the Ser. No. 13/489,434 applications are incorporated by reference in their entirety herein.

BACKGROUND

Many modern computer systems try to opportunistically reduce power consumption during periods of reduced activity. Common techniques include reducing or shutting down voltage power supply levels to one or more system components, stopping clocks, and so forth.

Different power consumption modes for computer systems have been dubbed $C_n$ (or alternately $S_n$ or $P_n$) states which indicate progressively greater power savings modes. The different modes often feature different wake latencies—the amount of time needed to resume a higher power mode. Thus, the choice of entering a particular power saving mode often requires a balancing between the amount of power savings and the amount of time needed to wake.

BRIEF DESCRIPTION OF THE DRAWINGS

FIGS. 8, 9, and 10 are diagrams of auto-negotiation messages.

FIGS. 11, 12, and 13 are diagrams of link layer discovery protocol frames.

DETAILED DESCRIPTION

In networking systems, a link connects and permits communication between two link partners. Data transmission between link partners can vary from large bursts of data to periods where no data needs to be transmitted at all. The absence of data transmission permits components in both link partners to enter low power modes. For example, the transmit circuitry in one link partner and the receive circuitry in the other link partner can both enter a low power mode. A low power mode may apply only to networking components. For example, the low power mode may strictly apply to a PHY, a component that handles physical transmission of data signals over a link. However, a low power mode may also potentially extend to other system components. For instance, when a server anticipates a lower volume of network traffic, the server can power down one or more processor cores and other system components (e.g., spinning down disks and so forth). As described above, a longer sleep duration can permit a system to enter a deeper power saving mode, though often at the expense of an increased wake latency. Thus, the larger the amount of time a system is given to wake, the more power that can be saved.

As described below, to potentially increase the continuous "quiet" duration available and thus enable the system to enter into a deeper power saving mode, a link partner can "borrow" time from its remote link partner by requesting a guarantee that the remote partner wait an amount of time (Tw system) after initially sending wake symbols to begin data transmission. For example, a transmitting link partner can buffer data in a transmit buffer to delay transmitting data to a link partner while the link partner wakes. The transmitting link partner may also use other ways to delay transmission, for example, by sending flow control messages to upstream nodes. The receive partner can use this known delay to enter a deeper power saving state that requires a longer wake-time and possibly postpone wake-up operations without suffering loss of data between the link partners. The amount of time a transmitter commits to providing to a receiver is a Tw system (a system transmit wake) value negotiated by the transmitter and receiver. A receiver can potentially add the Tw system time of its link partner to time provided, for example, by its own receive buffers, permitting an even larger time window to wake to further reduce system power consumption.

Figure 1:
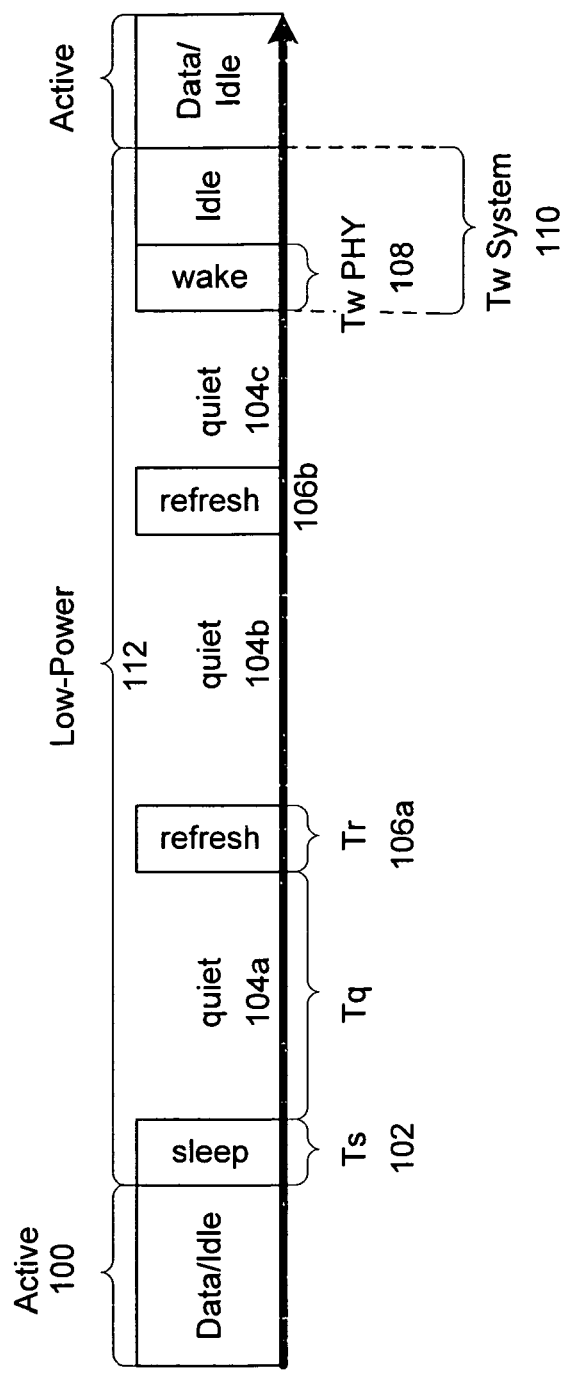
FIG. 1 is a timeline of transmissions by a link partner.

In greater detail, FIG. 1 depicts operation of a transmitting link partner over time. As shown, the link partner is initially active 100, transmitting data or idle symbols. When a temporary halt in transmission is foreseen (e.g., a transmit buffer is empty or falls below some threshold or the transmitting node itself is not receiving data), the transmitting link partner sends sleep symbols to its partner for a duration Ts 102. The transmitting link partner can then enter a reduced power mode 112. During this time, quiet periods (Tq 104a-104b) are periodically interrupted by brief refresh periods, Tr, 106a-106b where the link partners perform timing recovery and coefficient synchronization.

After determining transmission is to resume, the transmitting link partner wakes its PHY to an active mode. This takes an amount of time Tw PHY 108. Even after Tw PHY 108, however, the transmitting link partner continues to delay transmission of data until time Tw system 110 has elapsed, giving the receiver an additional Tw system 110 amount of time to wake beyond the initial transmission of wake symbols.

The Tw system 110 value may be derived in a variety of ways. For example, a receiver may request a desired amount of time, Tw Rx, before data transmissions resume. The receiver may determine the value of Tw Rx based on a variety of factors such as system performance requirements, system wake time, the size of a receive buffer to store data, the time needed to wake the receiver PHY, and/or on the power saving mode sought.

A transmitter may likewise determine an amount of time, Tw Tx, that the transmitter offers to delay data transmission after transmission of wake symbols. Again, the Tw Tx value may be based on a variety of factors such as the Tw PHY value of the transmitter and/or the amount of a transmit buffer available to the link.

The Tw system value, the negotiated amount of time a transmitter commits to delaying transmission, can be resolved to the lesser of the transmitters Tw Tx value and the receivers Tw Rx value. This ensures that both link partners can support the negotiated Tw system value.

Typically, a link supports a duplex connection between partners. That is, both partners send and receive data. Thus, the different directions of a link may be characterized by different Tw system values and each partner may have its own Tw Tx and Tw Rx values. The negotiation of the Tw system values may feature an exchange of the Tw Tx and Tw Rx values between the partners.

Figure 2:
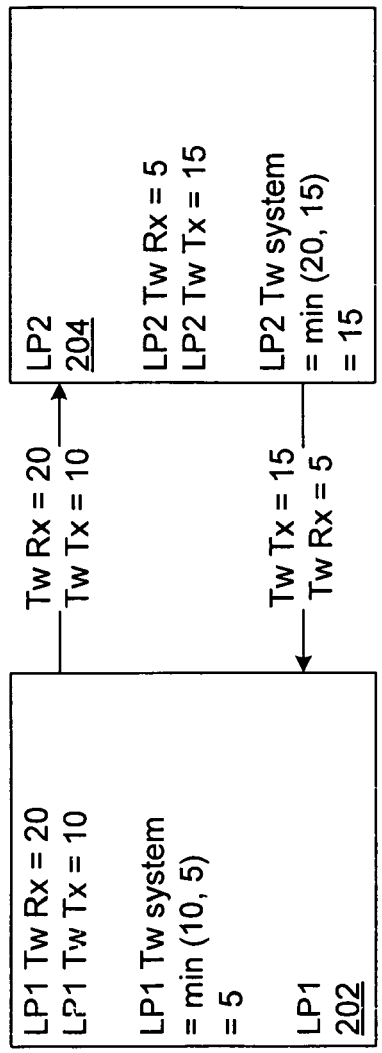
FIG. 2 is a diagram illustrating resolution of transmit wake times by link partners.

FIG. 2 illustrates a sample negotiation between link partners LP1 and LP2. As shown, link partner LP1 has a Tw $Rx_{(LP1)}$ value of 20 ms and a Tw $Tx_{(LP1)}$ value of 10 ms. In other words, link partner LP1 is requesting a delay of transmission from partner 204 of 20 ms and offers a 10 ms delay of transmission to partner LP2. Similarly, link partner LP2 has a Tw $Tx_{(LP2)}$ value of 15 ms and a Tw $Rx_{(LP2)}$ value of 5 ms.

After exchange of these values between partners, both partners can determine the Tw $system_{(LP1)}$ and Tw $system_{(LP2)}$ values. In the example shown, the exchanged values yield a Tw $system_{(LP1)}$ value of 5 ms for transmission from partner LP1 to partner LP 2. In other words, while partner LP1 offered a 10 ms delay, LP2 only requested a 5 ms delay. Likewise, the Tw $system_{(LP2)}$ value resolves to a Tw $system_{(LP2)}$ value of 15 ms—the lesser of the 20 ms delay requested by partner LP1 and the 15 ms delay offered by partner LP 2.

While FIG. 2 illustrates a single negotiation, the negotiation may be performed any number of times based on system performance or energy savings priorities. For example, partner LP 2, after having received Tw $Tx_{(LP1)}$ may determine a deeper sleep mode may be possible and initiate a renegotiation with a larger Tw $Rx_{(LP2)}$ value. Additionally, the Tw Rx and Tw Tx values of a link partner may change over time. For example, as fewer buffers may be allocated to a particular link, a partner may offer a smaller Tw Tx value. Likewise, a partner may determine a deeper power reduction mode is not possible due to other network traffic or system load and reduce its request (e.g., a smaller Tw Rx value). Additionally, the possible values of Tw system may be bounded by defined Tw system min and max values. Typically Tw min would be determined by the resume capabilities of the physical layer transceiver (PHY) being used.

Figure 3:
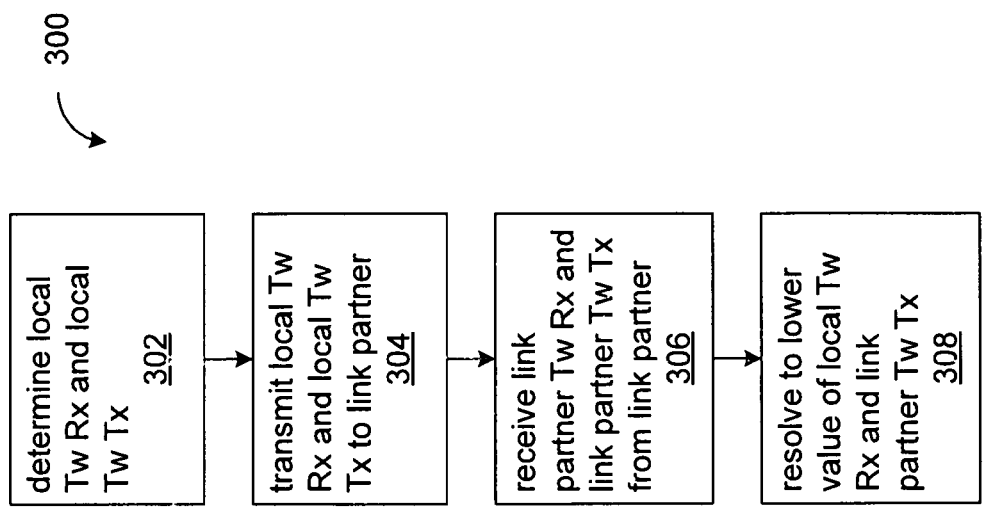
FIG. 3 is a flow-chart of a process to determine a transmit wake time.

FIG. 3 depicts a sample negotiation flow 300 of a local link partner. As shown, after determining local Tw Tx and Tw Rx values 302, these values are transmitted to a remote link partner 304. Before or after this transmission, the Tw Tx and Tw Rx values of the remote link partner are received 306. The egress Tw system value of the link partner is resolved 308 to the lower of the local Tw Tx value and the remote Tw Rx value. In the absence of an exchange of the Tw values, the Tw system value may default to a specified Tw min value.

Figure 4:
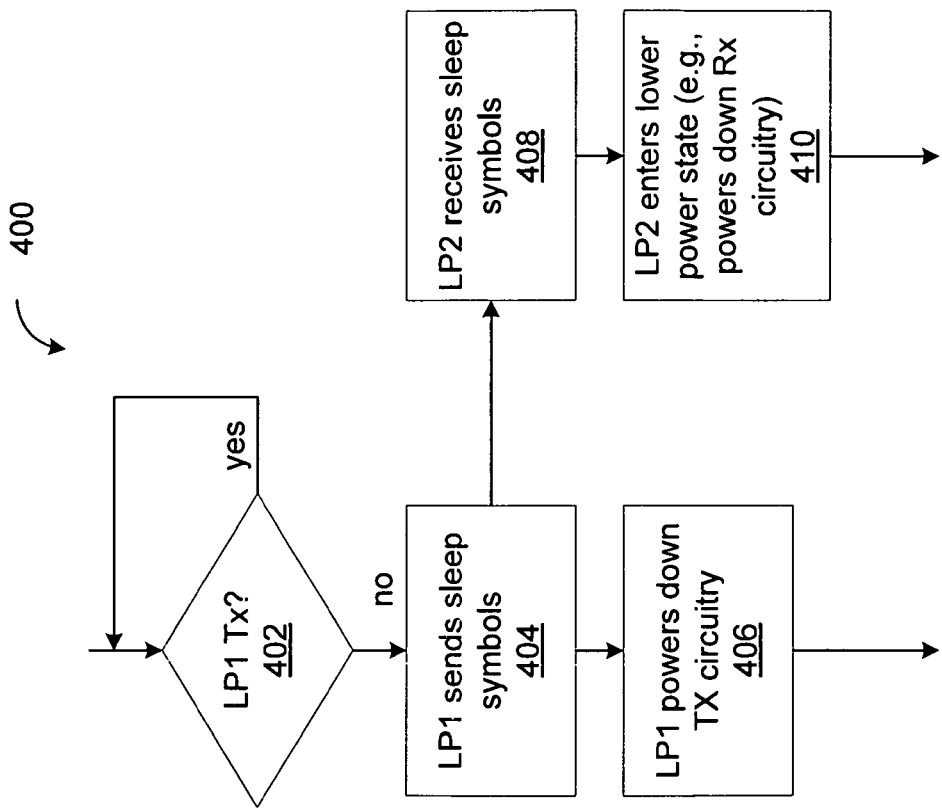
FIG. 4 is a flow-chart of a process to enable a link partner to power down.
Figure 5:
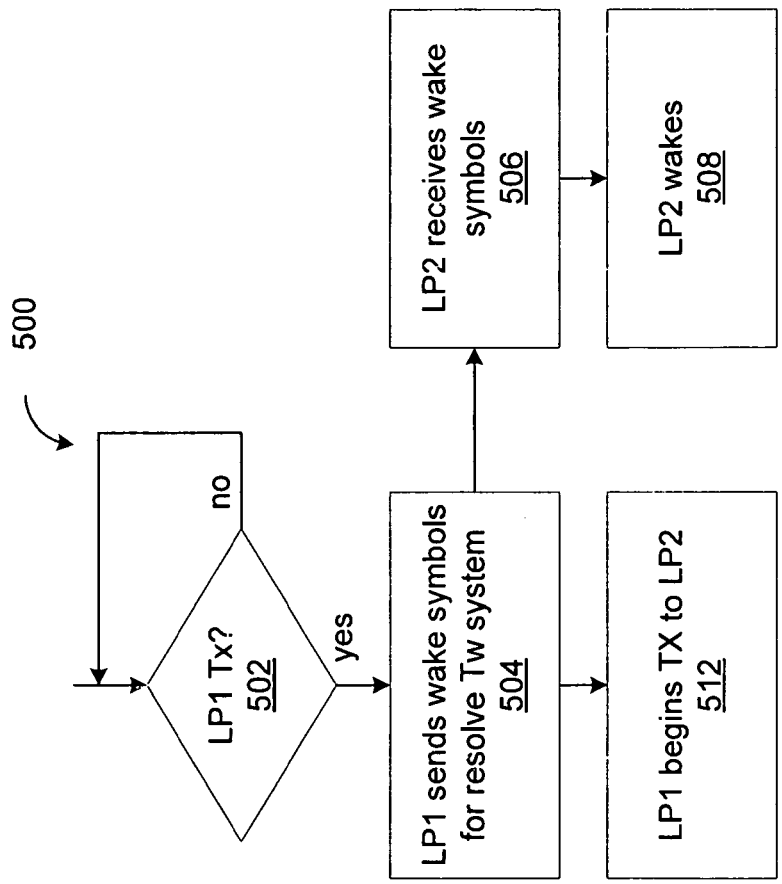
FIG. 5 is a flow-chart of a process to resume data transmission to a link partner.

FIGS. 4 and 5 depict sample operation 400 after the negotiation. As shown in FIG. 4, when LP1 determines 402 transmissions to LP2 may be temporarily suspended, LP1 sends sleep symbols 404 to LP2. Thereafter, LP1 powers down 406 its transmission circuitry. When LP2 receives the sleep symbols 408, LP2 also enters a lower power state, for example, by powering down receive circuitry 410.

As shown in FIG. 5, when LP1 determines 502 transmission to LP2 will shortly resume, LP1 sends 504 wake symbols to LP2. After receipt 506, LP2 wakes 508, for example, fully powering the LP2 PHY receive circuitry. LP1 delays data transfer to LP2 (e.g., buffers Tx data) after initial transmission of the wake symbols for, at least, the negotiated Tw system time period for the egress link of LP1. Thereafter, LP1 transfers the data buffered during the Tw system period and operation returns to normal.

The techniques described above may also be used when a link has a low bandwidth utilization rate compared to the maximum data throughput capabilities of the link. For example, when data destined for LP2 is arriving at a very slow rate with respect to the size of the transmitter Tx buffer, LP1 can send sleep symbols and enable LP2 to enter a low power mode while the Tx buffer of LP1 slowly accumulates data. When stored data in LP1's Tx buffer exceeds some watermark threshold that still permits an egress Tw system transmission delay, LP1 can send wake symbols.

Figure 6:
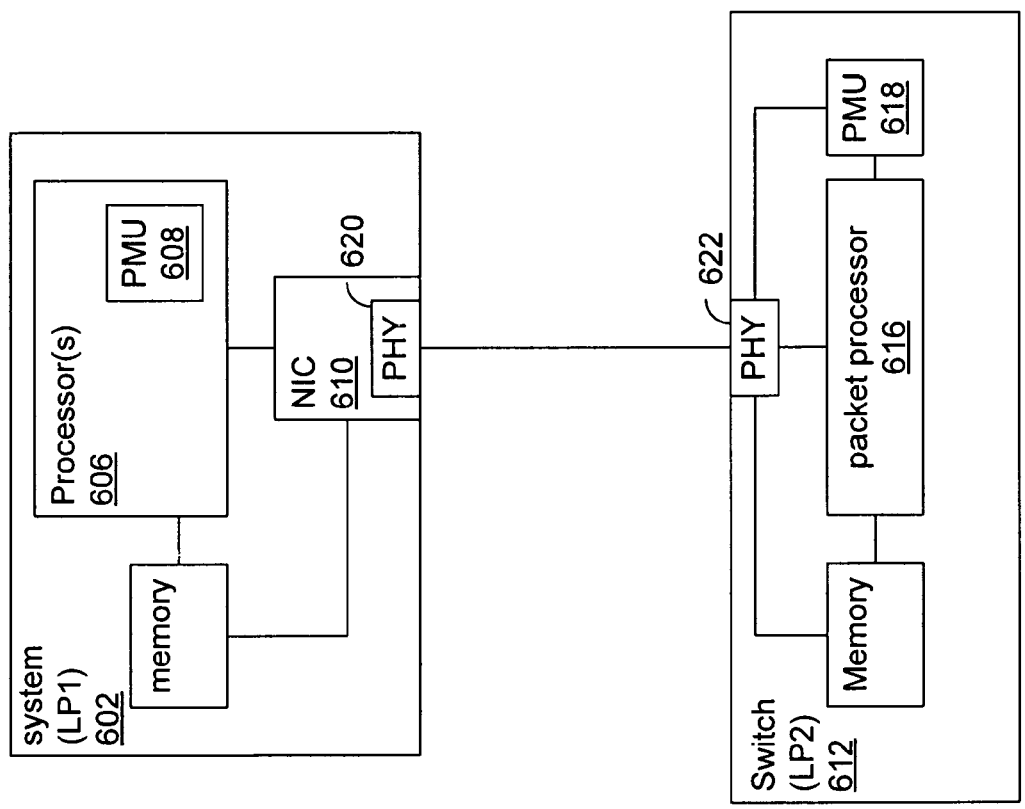
FIG. 6 is a diagram illustrating link partners.

FIG. 6 illustrates sample architecture of link partners LP1 602 and LP2 612. In this example, LP1 is a host computer system having a one or more processors 606. For example, the processors may be programmable cores integrated on the same die or within the same package. The system 602 includes a network interface controller (NIC) 610. The NIC 610 may be an integral part of the system (e.g., integrated within a motherboard or the same die as the processor(s)) or an attached unit (e.g., a NIC card).

Also shown in FIG. 6 is a power management unit 608. The power management unit 608 includes circuitry to control power usage by system components. For example, the power management unit 608 may initiate one of several different sets of varying power usage modes (e.g., Cn, Sn, or Pn sleep modes) where increasing values of n correspond to deeper power saving modes. The power management unit 608 may also control power provided to other components (e.g., processor, chipset, accelerators, I/O systems, mass storage devices, and so forth). For example, the power management unit 608 may interact with the NIC 610 and/or NIC PHY 620 to control power usage. For example, the power management unit 608 may access Tw PHY data from the PHY (e.g., stored in a PHY register accessible to external components) to determine a local Tw Rx value. The power management unit 608 may also sent data to the PHY 620 indicating a desired Tx Rx based on the amount of wake time needed for a particular power saving mode selected from a set of power saving modes (e.g., $C_n$ or $P_a$).

The power management unit 608 may implement different policies to determine a target power saving mode/Tx Rx. For example, a power management unit 608 for a battery powered mobile system or laptop may attempt to negotiate sufficient time to enter a more aggressive power savings mode than a continually powered desktop system. The power management unit 608 may also take into account thermal considerations. For example, an extended power saving period permits a greater amount of thermal dissipation which may be particularly advantageous in compact mobile devices. In the event negotiation of a Tw system value does not permit entry into a desired power saving mode, the power management unit can select a power saving mode that requires a smaller wake latency and attempt renegotiation with a smaller Tw Rx value.

The power management unit 608 may initiate power savings based, at least in part, on the negotiated ingress Tw system value. The power management unit 608 may also select a power saving mode based on other factors such as requirements of executing applications, the systems receive buffer size, and so forth. After receiving sleep messages, the power management unit 608 may be notified of the current Tw system value. Alternately, the value may have been communicated previously (e.g., whenever negotiated) and the power management unit 608 is informed only of the arrival of sleep messages. Thereafter, the power management unit 608 can initiate entry into a selected power mode, again, based at least in part, on the ingress Tw system value (e.g., a higher Tw system value results in a deeper power saving mode). After the power management unit 608 is notified of receipt of wake messages, the power management unit 608 can initiate waking of system components to enter a different selected power mode.

As shown, LP1 602 shares a link with switch LP2 612. The link may be a cabled, electrical backplane, wireless, or optical link, in turn, requiring the appropriate physical transceiver (PHY) circuitry.

The switch 612 connects to the link via PHY 622. As shown, the switch 612 features packet processing circuitry 616 such as an ASIC (Application Specific Integrated Circuitry) or Network Processor to perform switching operations such as forwarding lookups, etc. The switch 612 may also feature a power management unit 618 that operates as described above, for example, by interacting with the PHY 622 to access Tw PHY and determine Tw Tx or set Tw Rx based on switch 612 wake latencies. The power management unit 618 may also coordinate power consumption of switch 612 components based, at least in part, on a negotiated ingress Tw system value. For example, the power management unit 618 may enter different power modes based on receipt of sleep or wake symbols from LP1 602.

Though FIG. 6 illustrated link partners as a host computer system 602 and a switch 612, the operations described above may be implemented by other devices. For example, the link partners may be blades or line cards interconnected by a backplane. Additionally, though LP1 and LP2 are depicted as featuring a single link, either system may feature multiple links and negotiate respective Tw system values for each as described above. Further, while FIG. 6 depicts a discrete power management unit 608, the power management operations described above may be implemented in other circuitry.

Figure 7:
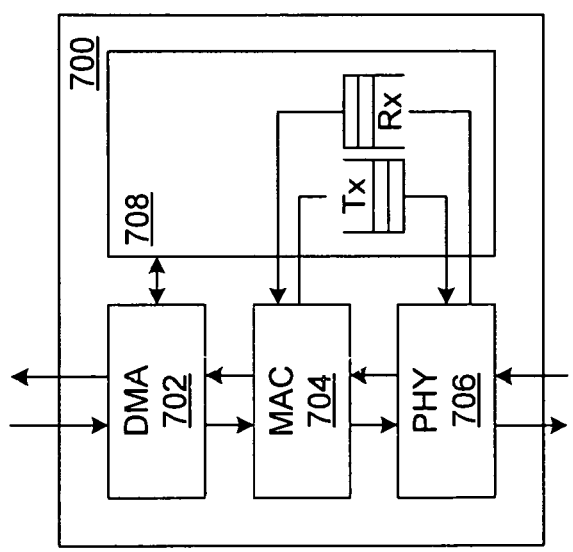
FIG. 7 is a diagram of a network interface controller.

FIG. 7 illustrates a sample NIC 700 in greater detail. As shown, the NIC 700 features a PHY 706 to perform physical signaling, a media access controller (MAC) 704, for example, to perform framing operations, and a direct memory access (DMA) engine to transfer packets between host memory and the NIC 700. The MAC 704 and PHY communicate via an egress Tx queue and ingress Rx queue in memory 708. The PHY 706 may feature one or more externally accessible registers to store Tx PHY and/or Tx Rx values.

Circuitry to perform the Tw system negotiation described above may be located in a variety of places within NIC 700. For example, the negotiation may be performed by physical coding sublayer (PCS) circuitry within the PHY 706. Alternately, the circuitry may be located within MAC 704. In other implementations, the circuitry may be implemented outside of the NIC 700, for example, in a power management unit or by driver software executed by a processor.

NIC architectures vary considerably from the one illustrated in FIG. 7. For example, some feature multiple instances of one or more of the components (e.g., multiple DMA engines, or multiple MACs and PHYs). Additionally, other NIC architectures feature offload circuitry (e.g., a TCP/IP [Transmission Control Protocol/Internet Protocol] offload engine or a CRC [Cyclic Redundancy Check] engine).

FIGS. 8-13 are diagrams of messages of messages that can be used to perform operations described above. More specifically, FIGS. 8-10 depict initial Ethernet PHY autonegotiation while FIGS. 11-13 depict LLDP (Link Layer Discovery Protocol) messages that can be used to exchange Tw values.

In greater detail, during initial auto-negotiation, a PHY can transmit a Fast Link Pulse identifying its capabilities. A fast link pulse may include, for example, 33-time slots with even slots carrying message data pulses. Each set of pulses is known as a page. As shown in FIG. 8 after an initial page carrying a technology ability field (TAF), a subsequent page may include a value of 0×0A to identify Energy Efficient Ethernet (EEE) capabilities. FIG. 9 depicts a subsequent page that identifies whether EEE is supported for different technologies. A further page, shown in FIG. 10, can identify a ratio between a PHYs Tq and Tr. The higher the ratio, the greater the opportunity for energy savings. For example, a "reduced energy" refresh duty cycle value (e.g., 0) may feature a Tq:Tr ratio of n:1 while a "lowest energy" refresh value (e.g., 1) may feature a greater Tq:Tr ratio. The link PHYs can advertise the refresh duty cycle values and resolve to the lower of the values.

As shown in FIG. 11, link layer discovery protocol (LLDP) messages may be used to exchange data between link partners. Briefly, LLDP (e.g., IEEE (Institute of Electrical and Electronic Engineers) 802.1AB) defines a set of type-length-value (TLV) fields used to identify the values of different types of data. As shown, in addition to fields required by LLDP, an LLDP message can include System Wake Times and EEE PHY parameters. As shown in FIG. 12, the system wake timers can include the Tw Tx and Tw Rx values for a link partner. That is, each link partner may send an LLDP message as shown in FIGS. 11 and 12 to exchange Tw values. As shown in FIG. 13, the EEE PHY parameters can include the refresh cycle value instead of, or in addition to, being communicated in the autonegotiation process.

The message formats shown in FIG. 8-13 are merely examples. For example, the data may be stored in different fast link pulse time slots or in different LLDP fields. Additionally, a wide variety of other techniques for communicating the Tw and/or PHY values may be used. For example, instead of, or in addition to, LLDP messages, Tw and PHY values may be exchanged via MCF (Mac Control Frames). Additionally, other information may be exchanged. For example, link partners may exchange their Tw PHY values as part of the negotiation to provide greater information to a link partner. This can facilitate a renegotiation based on the Tw PHY value (e.g., a system cannot offer a Tw system value less than Tw PHY).

The term circuitry as used herein includes hardwired circuitry, digital circuitry, analog circuitry, programmable circuitry, and so forth. The programmable circuitry may operate on computer program instructions stored on tangible computer readable storage mediums.

Other embodiments are within the scope of the following claims.

What is claimed is:

1. A method, comprising:
   receiving, from a link partner, a message specifying a link partner receive wake time;
   resolving to a transmit wake time based on the received link partner receive wake time and a local transmit wake time;
   after sending a wake message to the link partner, delaying transmission of data destined for the link partner for at least the transmit wake time;
   resuming transmission of data to the link partner after the transmit wake time.

2. The method of claim 1,
   further comprising determining the local transmit wake time based on an amount of buffer to store data destined for the remote link partner; and wherein delaying transmission comprises buffering data destined for the remote link buffer.

3. The method of claim 1,
wherein the message further specifies a link partner transmit wake time; and
further comprising determining a local receive wake time based, at least in part, on a wake time of a PHY.

4. The method of claim 3, wherein the determining the local receive wake time comprises determining based on a wake requirement of a one of a set of multiple power reduction modes.

5. The method of claim 1,
further comprising transmitting a frame to the link partner, the frame comprising the local transmit wake time and a local receive wake time.

6. The method of claim 1,
wherein the message comprises a link layer discovery protocol frame.

7. The method of claim 1,
further comprising transmitting an indication of a quiet/refresh ratio in an even numbered time slot of a link pulse.

8. The method of claim 2, wherein the receiving, the resolving, and the buffering comprises receiving, resolving, and buffering at a network interface controller, the network interface controller comprising a PHY, a media access controller, and a direct memory access (DMA) engine.

9. The method of claim 1, wherein the message further comprises a wake time for a PHY.

10. A system, comprising:
a network interface controller, the network interface controller comprising:
a PHY;
a media access controller;
a direct memory access engine; and
circuitry to
receive, from a link partner, a message specifying a link partner receive wake time;
resolve to a transmit wake time based on the received link partner receive wake time and a local transmit wake time;
delay transmission of data destined for the link partner for at least the transmit wake time;
resume transmission of data to the link partner after the transmit wake time.

11. The system of claim 10,
further comprising circuitry to store a local transmit wake time.

12. The system of claim 10,
wherein the PHY comprises circuitry to store a PHY transmit wait time.

13. The system of claim 10, wherein the message further specifies a link partner transmit wake time.

14. The system of claim 13, to determine the local receive wake time based on requirements of one of a set multiple power reduction modes.

15. The system of claim 10,
further comprising circuitry to transmit a message to the link partner, the message comprising a local transmit wake time and the local receive wake time.

16. The system of claim 10,
wherein the message comprises a link layer discovery protocol frame.

17. The system of claim 10,
further comprising circuitry to transmit an indication of a quiet/refresh ratio of the PHY in an even numbered time slot of a link pulse.

18. The system of claim 10,
further comprising:
memory;
a processor; and
a power management unit, the power management unit to indicate to the network interface controller a wake period associated with a selected one of multiple power reduction modes.

19. The system of claim 18, wherein the power management unit enters a selected one of multiple power reduction modes based on the transmit wake time.

20. A method, comprising:
receiving, from a link partner, a message specifying a link partner transmit wake time;
resolving to a transmit wake time based on the received link partner transmit wake time and a local receive wake time;
after receiving a sleep message from the link partner, entering a system power saving mode based, at least in part, on the resolved receive wake time;
after receiving a wake message from the link partner, exiting the system power saving mode; and
receiving data from the link partner only after the resolved receive wake time.

21. The method of claim 20,
further comprising notifying a system power management unit of the resolved transmit wake time.

22. The method of claim 21,
wherein notifying the system power management unit comprises notifying after receiving the sleep message.

* * * * *